June 14, 1949.  F. O. LUENBERGER  2,473,105
ELECTRIC MOTOR MOUNTING
Filed April 24, 1948  2 Sheets-Sheet 1
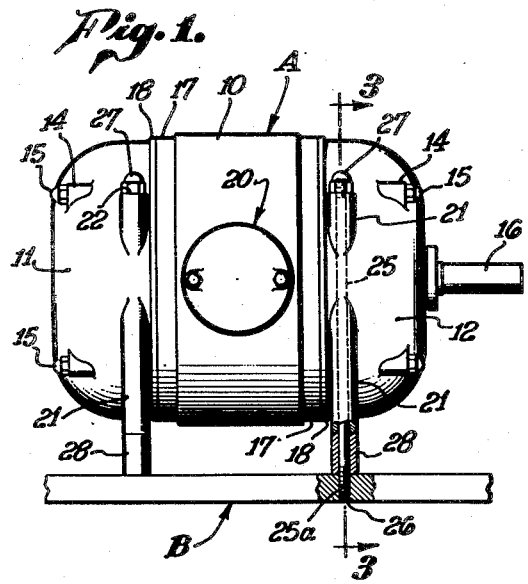
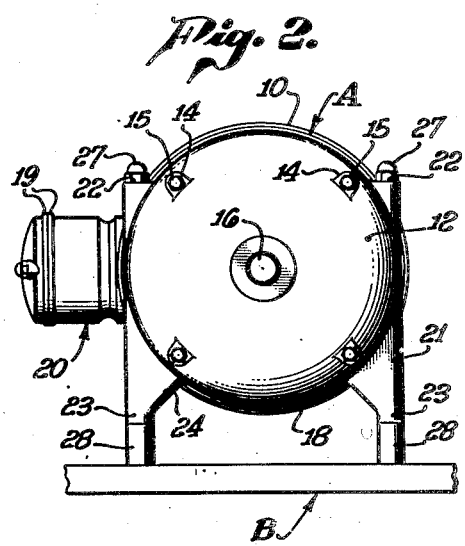
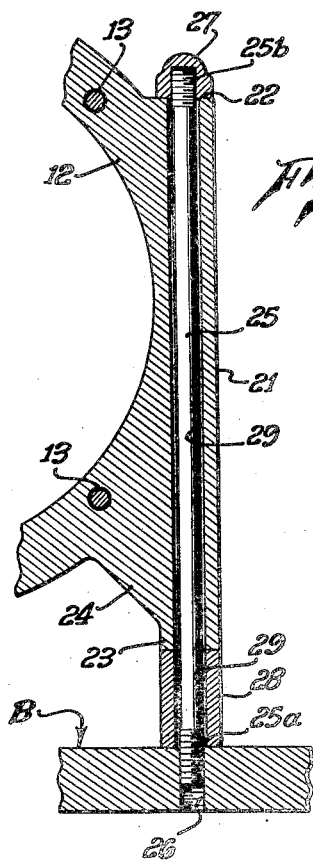
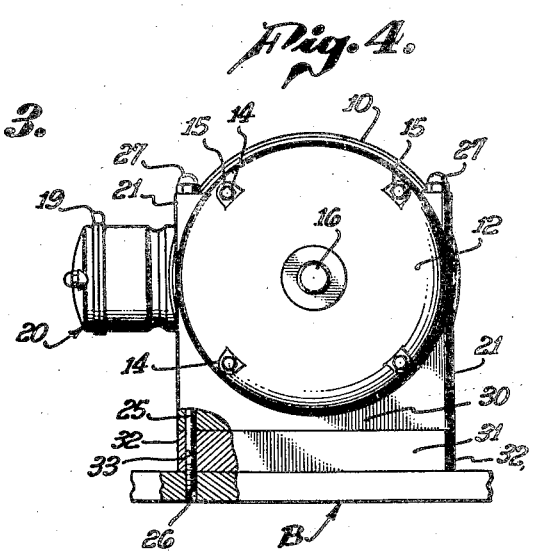
INVENTOR.
FREDERICK O. LUENBERGER,
BY
John Flam
ATTORNEY.

Patented June 14, 1949

2,473,105

UNITED STATES PATENT OFFICE 2,473,105

ELECTRIC MOTOR MOUNTING

Frederick O. Luenberger, Los Angeles, Calif., assignor to U. S. Electrical Motors, Inc., Los Angeles, Calif., a corporation of California Application April 24, 1948, Serial No. 23,123

16 Claims. (Cl. 172—36)

The present invention relates to electric motors, and more particularly to the mounting of such motors on suitable bases or supports.

In certain industries, it is essential that electric motors be employed which avoid cracks and crevices, and which are easy to maintain in clean condition. This is especially true of milk plants and various canning and food processing plants forming parts of the sanitary industries. The requirement for sanitation normally necessitates the complete sealing of the motor to its supporting base, or the provision of sufficient clearance between the motor and base to permit ready, accessible cleaning. This requirement cannot be attained readily when the ordinary electric motor with L-shaped feet is used, since difficulty is experienced in keeping the bolts passing through the feet, the bottom of the motor, and the adjacent mounting base for the motor clean.

Accordingly, it is an object of the present invention to provide an electric motor which can be maintained easily in a sanitary condition.

Another object of the invention is to mount an electric motor in such manner as to enable it to be cleaned easily, as well as its mounting base or support. Still another object of the invention is to provide an electric motor which can be mounted on a base with an intervening clearance space that can be cleaned readily.

A further object of the invention is to fasten a motor to its base by devices that are readily accessible for cleaning.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of this invention is best defined by the appended claims.

Referring to the drawings:

Figure 1 is a side elevation of an electric motor secured to a base or support, a portion being broken away to disclose certain internal parts;

Fig. 2 is an end view of the apparatus, as seen from the right of Fig. 1;

Fig. 3 is an enlarged, fragmentary section taken along the line 3—3 on Fig. 1;

Fig. 4 is an end view of a modified form of electric motor mounted on a base, a portion being broken away to disclose certain internal parts;

Figure 5:
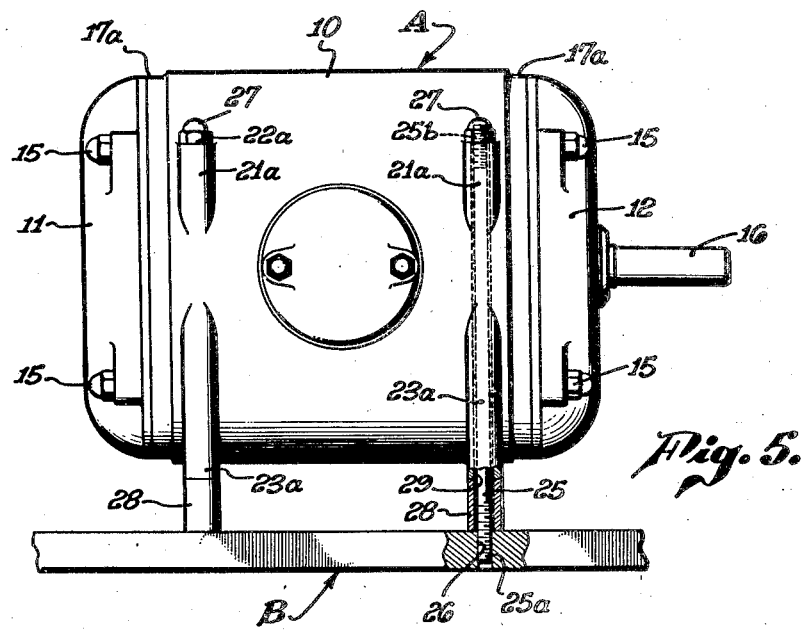
Fig. 5 is a view similar to Fig. 1 of another embodiment of the invention.

As shown in the drawings, an electric motor A is mounted on a base or support B. The electric motor includes a frame 10 and opposed end bells 11, 12 that are attached to the frame by studs 13 passing completely through the three parts, with the ends of the studs projecting from bosses 14 formed on the bells. Cap nuts 15 are threaded on the opposite ends of each stud 13 and, upon being tightened against the bosses 14, hold the motor frame 10 and end bells 11, 12 clamped securely together. As is well known, the motor frame 10 contains the usual stator windings, while the end bells serve as bearing supports for the motor shaft 16.

In order to avoid cracks or crevices between the parts, which would promote the accumulation of dirt, the peripheral end portions 17 of the motor frame 10 are machined to a definite diameter which matches the adjacent machined peripheries 18 on the end bells 11, 12. Accordingly, a flush joint 17, 18 is provided between the motor frame and each of the end bells, which can be wiped and cleaned easily.

Similarly, the adjacent peripheral end portions 19 of the mating parts of the conduit terminal box 20 are also machined to the same definite diameter, to prevent cracks or crevices.

The motor A is adapted to be secured to the base or support B. To accomplish this purpose, the end bells 11, 12 are provided with bosses 21 extending substantially normal to the axes of the studs 13 holding the motor frame 10 and end bells 11, 12 together. The upper end of each boss 21 provides a shoulder 22. Its lower portion provides a foot 23 which is braced from the main body of the end bell by an integral diagonal portion 24. This diagonal portion prevents narrow recesses between the boss 21 and end bell that would be difficult to clean, and which would furnish an area for dirt accumulation.

The motor A is firmly secured to the base or support B by studs 25 extending through the bosses 21, with their lower ends 25a threaded into tapped holes 26 in the base B, and with their upper ends 25b disposed slightly above the boss shoulders 22. Cap nuts 27 are threaded on the upper ends 25b of the studs, which, when tightened against the shoulders 22, serve to clamp the motor A securely to the base B.

The motor may be clamped directly to the base when the latter provides the necessary clearance. When not provided, suitable spacers 28 may be interposed between the lower ends 23 of the bosses and the base B. As shown in Figs. 1 to 3, inclusive, each spacer 28 is in the form of a sleeve, of suitable length to provide the necessary clearance, having an external diameter substantially equal to the adjacent external diameter of the boss boot 23, in order to prevent cracks or crevices. As is apparent from the drawings, the studs 25 extend through the end bell bosses 21 and spacer sleeves 28 into the tapped holes 26 in the base. Tightening of the cap nuts 27 at the upper end of the motor will clamp all parts securely together.

In order to permit slight shifting of the motor A on its mounting B before final clamping, the holes 29 in the bosses 21 and spacer sleeves 28 are made larger than the diameter of the studs 25, finishing the required clearance that enables slight transverse movement of the motor A with respect to the base B prior to final tightening of the cap nuts 27.

In the form of invention disclosed in Fig. 4, the motor construction and its mounting is essentially the same as in the embodiment described above. Instead of separate depending foot portions 23 on each boss, the latter are integrated through a transverse interconnecting web 30 extending along the entire lower surface of each end bell 12. The studs 25 and cap nuts 27 serve to clamp the motor A directly to the base B, as before; or, the necessary clearance between the motor and base may be provided by interposing a spacer member 31 having the same thickness as the web 30 and end portions 32 matching the rounded ends of the bosses 21. The spacer member 31 also has holes 33 aligned with the holes in the bosses 21 to permit passage of the studs 25.

The web arrangement 30 disclosed in Fig. 4 affords a flush joint with the spacer member 31 and less regions for the accumulation of dirt than in the other form of the invention.

Figure 6:
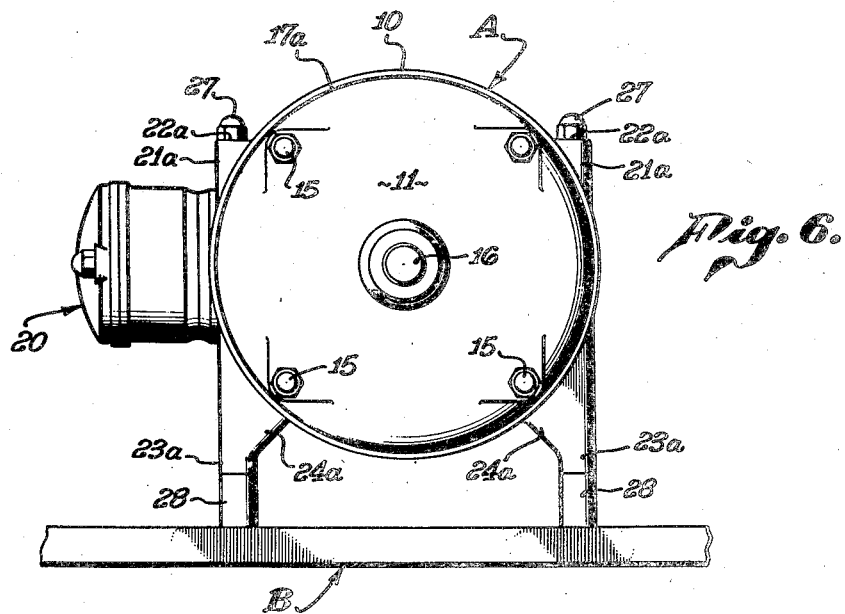
Fig. 6 is an end view of the apparatus, as seen from the right of Fig. 5.

In the form of invention illustrated in Figs. 5 and 6, the bosses 21a are formed integrally with the frame 10 of the motor casing, rather than with the end bells, as in the other forms described. These bosses extend substantially at right angles to the axis of the motor and of the studs 13 securing the end bells 11, 12 to the motor frame 10. In general, they are arranged in essentially the same manner as described in connection with the other forms of the invention. Thus, each boss 21a has a depending foot portion 23a and an integral diagonal portion 24a, and is also provided with an upper shoulder 22a against which the cap nut 27 may bear. Also, each boss has a bore 29 of slightly greater diameter than the diameter of the stud 25 used for attaching the motor to the base B, for the purpose of permitting slight shifting of the motor A with respect to the base.

The motor may be mounted directly on the base by threading the lower ends 25a of the studs into the tapped holes 26 in the base B, with the upper ends 25b of the studs extending upwardly through the bosses 21a and projecting slightly above their upper ends. The cap nuts 27 are threaded on these ends 25b and may be tightened against the boss shoulders 22a.

If greater clearance is desired between the motor A and the base B, intervening spacers 28 may be used, in the same manner as described above in connection with the other forms of the invention.

The contiguous peripheral portions 17a, 18a on the frame 10 and end bells 11, 12 are also machined to the same diameter to provide flush joints that are not conducive to dust or dirt accumulation.

From the foregoing description, it is apparent that electric motor mountings have been provided affording a minimum of regions in which dirt can accumulate, and which also enables the parts to be cleaned readily. Not only are all parts substantially smooth and, therefore, easily cleaned, but the cap nuts 27 themselves are disposed at readily accessible portions of the motor for cleaning purposes.

The inventor claims:

1. In an electric motor: a casing including a motor frame and adjacent end bells on opposite sides thereof; means securing said frame and end bells together; and means for mounting said casing on a base, comprising bosses on said bells substantially normal to the axis of said motor and adapted to receive fastening elements.

2. In an electric motor: a casing including a motor frame and adjacent end bells on opposite sides thereof; means securing said frame and end bells together; said bells having holes therethrough substantially normal to the motor axis for the reception of fastening elements.

3. In an electric motor: a casing including a motor frame and adjacent end bells on opposite sides thereof; means securing said frame and end bells together; said frame having holes therethrough substantially normal to the motor axis for the reception of fastening elements.

4. In an electric motor: a casing including a motor frame and adjacent end bells on opposite sides thereof; means extending substantially parallel to the motor axis for securing said frame and end bells together; said casing having holes therethrough substantially normal to the motor axis through which fastening elements can pass for securing the motor to a base.

5. In an electric motor: a casing including a motor frame and adjacent end bells on opposite sides thereof; means extending substantially parallel to the motor axis for securing said frame and end bells together; said bells having holes therethrough substantially normal to the motor axis, through which fastening elements can pass for securing the motor to a base.

6. In an electric motor: a casing including a motor frame and adjacent end bells on opposite sides thereof; means extending substantially parallel to the motor axis for securing said frame and end bells together; said frame having holes therethrough substantially normal to the motor axis through which fastening elements can pass for securing the motor to a base.

7. In an electric motor: a casing including a motor frame and adjacent end bells on opposite sides thereof; means extending substantially parallel to the motor axis for securing said frame and end bells together; and means for mounting said casing on a base, comprising elongate bosses on said casing substantially normal to the motor axis, each boss extending from a point at the bottom of the casing to the upper portion of the casing.

8. In an electric motor: a casing including a motor frame and adjacent end bells on opposite sides thereof; means extending substantially parallel to the motor axis for securing said frame and end bells together; and means for mounting said casing on a base, comprising elongate bosses on said bells substantially normal to the motor axis, each boss extending from a point at the bottom of the bell to the upper portion of the bell.

9. In an electric motor: a casing including a motor frame and adjacent end bells on opposite sides thereof; means extending substantially parallel to the motor axis for securing said frame and end bells together; and means for mounting said casing on a base; comprising elongate bosses on said frame substantially normal to the motor axis, each boss extending from a point at the bottom of the frame to the upper portion of the frame.

10. In an electric motor: a casing including a motor frame and adjacent end bells on opposite sides thereof; means extending substantially parallel to the motor axis for securing said frame and end bells together; and means for mounting said casing on a base, comprising elongate bosses on said bells substantially normal to the motor axis and extending to the upper portions of said bells, said bosses having lower foot portions.

11. In an electric motor: a casing including a motor frame and adjacent end bells on opposite sides thereof; means extending substantially parallel to the motor axis for securing said frame and end bells together; and means for mounting said casing on a base, comprising elongate bosses on opposite sides of said casing, said bosses extending substantially normal to the motor axis from the upper portion of said casing and terminating in lower foot portions.

12. In an electric motor: a casing including a motor frame and adjacent end bells on opposite sides thereof; means extending substantially parallel to the motor axis for securing said frame and end bells together; and means for mounting said casing on a base, comprising elongate bosses on opposite sides of said frame, said bosses extending substantially normal to the motor axis from the upper portion of said frame and terminating in lower foot portions.

13. In an electric motor: a casing including a motor frame and adjacent end bells on opposite sides thereof; means extending substantially parallel to the motor axis for securing said frame and end bells together; and means for mounting said casing on a base, comprising elongate bosses on opposite sides of said bells, said bosses extending substantially normal to the motor axis from the upper portions of said bells and terminating in lower foot portions; and a web extending transversely below each bell and interconnecting the bosses on opposite sides thereof.

14. In an electric motor mounting: a base; a casing including a motor frame and adjacent end bells on opposite sides thereof; means extending substantially parallel to the motor axis for securing said frame and end bells together; elongate bosses on said bells extending from a point at the bottom of the bells to their upper portions; means extending through said bosses and into said base for securing said casing to said base, said last-mentioned means bearing upon the upper ends of said bosses.

15. In an electric motor mounting: a base; a casing including a motor frame and adjacent end bells on opposite sides thereof; means extending substantially parallel to the motor axis for securing said frame and end bells together; elongate bosses on said casing extending from a point at the bottom of the casing to its upper portion; studs extending through said bosses and into said base; and nuts on the upper ends of said studs bearing upon the upper ends of said bosses.

16. In an electric motor mounting: a base; a casing including a motor frame and adjacent end bells on opposite sides thereof; means extending substantially parallel to the motor axis for securing said frame and end bells together; elongate bosses on said bells extending from a point at the bottom of the bells to their upper portions; studs extending through said bosses and into said base; and nuts on the upper ends of said studs bearing upon the upper ends of said bosses.

FREDERICK O. LUENBERGER.

REFERENCES CITED

The following references are of record in the file of this patent:

UNITED STATES PATENTS

| Number | Name | Date |
|---|---|---|
| 963,755 | Forsland | July 12, 1901 |
| 1,456,120 | Burke | May 22, 1933 |